(12) United States Patent
Snawerdt

(10) Patent No.: US 6,469,816 B1
(45) Date of Patent: *Oct. 22, 2002

(54) PHASE-MODULATED FIBER OPTIC TELECOMMUNICATIONS SYSTEM

(75) Inventor: Peter Snawerdt, Melbourne Beach, FL (US)

(73) Assignee: Oyster Optics, Inc., New York, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/865,173

(22) Filed: May 24, 2001

Related U.S. Application Data

(63) Continuation-in-part of application No. 09/765,153, filed on Jan. 17, 2002.

(51) Int. Cl.[7] .......................... H04B 10/04; H04B 10/12
(52) U.S. Cl. ...................................................... 359/183
(58) Field of Search ................................. 359/173, 183, 359/154, 156, 158, 161; 380/21

(56) References Cited

U.S. PATENT DOCUMENTS

| | | | |
|---|---|---|---|
| 4,754,452 A | 6/1988 | Henry | 370/85 |
| 5,223,967 A | 6/1993 | Udd | 359/119 |
| 5,239,306 A | 8/1993 | Siwiak et al. | 340/825.44 |
| 5,291,516 A | 3/1994 | Dixon et al. | 375/1 |
| 5,455,698 A | 10/1995 | Udd | 359/119 |
| 5,543,952 A * | 8/1996 | Yonenaga et al. | 359/181 |
| 5,606,446 A | 2/1997 | Davis et al. | 359/173 |
| 5,625,479 A * | 4/1997 | Suzuki et al. | 359/135 |
| 5,726,784 A | 3/1998 | Alexander et al. | 359/125 |
| 5,745,613 A | 4/1998 | Fukuchi et al. | 385/24 |
| 5,757,912 A | 5/1998 | Bow | 380/21 |
| 5,793,512 A | 8/1998 | Ryu | 359/179 |
| 5,896,211 A | 4/1999 | Watanabe | 359/124 |
| 5,920,416 A | 7/1999 | Beylat et al. | 359/181 |
| 5,940,452 A | 8/1999 | Rich | 375/347 |
| 5,946,119 A | 8/1999 | Bergano et al. | 359/124 |
| 5,953,139 A * | 9/1999 | Nemecek et al. | 359/124 |
| 5,953,421 A * | 9/1999 | Townsend | 380/21 |
| RE36,430 E | 12/1999 | Halbert-Lasalle et al. | 370/204 |
| 6,072,615 A | 6/2000 | Mamyshev | 359/183 |
| 6,097,525 A | 8/2000 | Ono et al. | 359/181 |
| 6,124,960 A | 9/2000 | Garthe et al. | 359/181 |
| 6,215,565 B1 | 4/2001 | Davis et al. | 359/110 |
| 6,243,505 B1 | 6/2001 | Bosso et al. | 385/2 |
| 6,256,130 B1 | 7/2001 | Bülow | 359/173 |
| 6,404,528 B1 | 6/2002 | Pfeiffer | 359/189 |

\* cited by examiner

Primary Examiner—Jason Chan
Assistant Examiner—David Payne
(74) Attorney, Agent, or Firm—Davidson, Davidson & Kappel, LLC

(57) ABSTRACT

A fiber optic data transmission system has a transmitter having a laser emitting a continuous wave light, a phase modulator phase modulating the continuous wave light so as to create an optical signal bearing information in phase-modulated form, and a telecommunications optical fiber connected to at least one receiver, the phase-modulator being connected to the telecommunications fiber so that the phase-modulated information optical signal is transmitted over the telecommunications fiber without recombining with the continuous wave light.

20 Claims, 3 Drawing Sheets

← time

DSI   010100111011010111101101011101

A     010000110110111001101101110010<u>00</u> ← 64
B     010100111011010111101101011101

OP    000100001101101100110110111001
OPD   010000110110111001101101110010__

DSO   010100111011010111101101011101__

Fig. 4

← time

DSI   010100111011010111101101011101

A     000101100011101100111000100111<u>10</u> ← 65
B     010100111011010111101101011101

OP    010001011000111011001110001001 1
OPD   000101100011101100111000100111__

DSO   010100111011010111101101011101__

Fig. 5

PHASE-MODULATED FIBER OPTIC TELECOMMUNICATIONS SYSTEM

CROSS-REFERENCE TO RELATED APPLICATIONS

The present application is a continuation-in-part of U.S. patent application Ser. No. 09/765,153 filed Jan. 17, 2002 and claims priority thereto.

BACKGROUND OF THE INVENTION

1. Field of the Invention

The present invention relates generally to telecommunications and more particularly to improving security and data transmission over fiber optic networks.

2. Background Information

In current fiber optic networks, an electronic data stream is fed to a laser amplitude modulator. The laser amplitude modulator typically pulses or alters the laser output to create an amplitude-modulated optical signal representative of the electronic data stream. The laser amplitude modulator and laser thus define a transmitter for transmitting the optical signal over an optical fiber, which is then received by a receiver. The receiver for the amplitude-modulated optical signals of the optical data typically includes a photodiode to convert the optical signals back into the electronic data stream.

The reading of the amplitude-modulated optical data signals using a photodiode is straightforward: the optical signals either produce an electric output at the photodiode or they do not. As a result, an output electronic data stream of zeros and ones is generated.

However, optical fiber may be tapped. The optical fibers can be spliced or even merely clamped so as to obtain optical signals from the fiber. It also may be possible to tap fibers without physically touching the optical fiber, for example by reading energy emanating or dissipating along the fiber. Amplitude-modulated optical signals, with their ease of detection from a photodiode, require that only a small amount of energy be tapped and passed through the photodiode in order to be converted into a tapped electronic data stream.

To confront non-secure optical and non-optical data lines, it has been known to use public key/private key encryption so that the data stream being transmitted is encoded in a format that makes it difficult to decode. Encryption however has several drawbacks, including the need for extra processing steps and time. Moreover, public key/private key encrypted data can be cracked, and the devices and algorithms for doing so are constantly improving.

In order to confront the problems of an amplitude-modulated system, U.S. Pat. No. 5,455,698 purports to disclose a secure fiber optic communications system based on the principles of a Sagnac interferometer. A data transmitter is a phase modulator for modulating counter-propagating light beams sent by a receiver round a loop. The receiver includes a light source, a beamsplitter for splitting light from the light source into counter-propagating light beams and for receiving the phase-modulated light beams, and an output detector. U.S. Pat. No. 5,223,967 describes a similar Sagnac-interferometer-based system operating over a single optical fiber.

The Sagnac-interferometer-based systems described in these patents have the disadvantage that they require the light to travel over a loop, whether back and forth in a single fiber or over a long length looped fiber. As a result, either the link budget for the single fiber must be doubled, reducing the data carrying capacity for a single fiber, or else a looped fiber with significant and expensive extra length of at least twice that of a single fiber must be laid between the transmitter and the receiver. Moreover, the receiver contains the light source, as opposed to the current installed base where the transmitter has the light source.

The Sagnac-interferometer-based systems thus are expensive to build and operate, and do not work particularly well with existing systems.

In addition, the Sagnac-interferometer-based systems in these patents desire a broadband low-coherence-length light source, for example from a light emitting diode. The light source thus typically generates light over a wavelength range of 10 nm or more.

U.S. Pat. No. 6,072,615 purports to describe a method for generating return-to-zero optical pulses using a phase modulator and optical filter. The RZ-pulse optical signal transmitted over the fiber is easily readable by a detector. The system is an amplitude-modulated system.

U.S. Pat. No. 5,606,446 purports to describe an optical telecommunications system employing multiple phase-compensated optical signals. Multiple interferometric systems are combined for the purpose of multiplexing various payloads on the same optical transmission path. The patent attempts to describe a method for providing fiber usage diversity using optical coherence length properties and a complex transmit/receive system. Each transmitter has a splitter, a plurality of fibers and a plurality of phase modulators to create the multiplexed signal, which is then demultiplexed at the receiver. This system is complex and expensive. Moreover, each phase-modulated light path is combined with a continuous wavelength base laser light path when sent over a telecommunications line, so that amplitude-modulated signals result.

As with U.S. Pat. No. 5,606,446, U.S. Pat. No 5,726,784 discloses creating an amplitude-modulated data stream by combining a phase-modulated light path with a continuous wave base laser light path. The '446 patent describes lasers with wavelength variance accurate to less than 1 nm variance to create a WDM system.

SUMMARY OF THE INVENTION

An object of the present invention is to provide an improved security optical fiber transmission system and device. An alternate or additional object of the present invention is to provide high bandwidth optical data transport via transmission and recovery of phase-modulated optical signals. Yet another alternate or additional object of the present invention is to provide a simple yet secure phase-modulated optical data transmission system.

The present invention provides a fiber optic data transmission system comprising a transmitter having a laser emitting a continuous wave light, a phase modulator phase modulating the continuous wave light so as to create a phase-modulated information optical signal, and a telecommunications optical fiber connected to at least one receiver, the phase-modulator being connected to the telecommunications fiber so that the phase-modulated information optical signal is transmitted over the telecommunications fiber without recombining with the continuous wave light.

The use of a laser for a phase-modulated telecommunications system provides many advantages over the broadband light desired by the aforementioned Sagnac systems, including that the wavelength can be selected to match the optical fiber characteristics so that the light can be transmitted further distances. Also the lasers can be used in a wave-division-multiplexing system.

The laser preferably has a wavelength that does not vary by more than 2 nm, and most preferably does not vary by more than 1 nm. The lasers for example may be semiconductor diode lasers.

The system of the present invention may be similar for example to that disclosed in U.S. Pat. No. 09/765,153 filed Jan. 17, 2001, which describes as well the controller for the phase-modulator. This application is hereby incorporated by reference herein.

The present invention also provides a method for sending data in phase-modulated form over a telecommunications optical fiber comprising the steps of phase-modulating light from a laser so as to create a phase-modulated optical data stream, and sending the phase-modulated optical data stream over a telecommunications optical fiber in a phase-modulated form.

By sending the data in phase-modulated form, as opposed to amplitude modulated form, the data is must be read by an interferometer receiver. The use of such a receiver is easy to detect.

The present method preferably includes receiving the phase-modulated optical data and passing it through an interferometer.

The present method also preferably includes monitoring the optical fiber for a reduction in the amplitude of the phase-modulated signal.

The present invention also provides an optical fiber having a uni-directional optical signal carrying data solely in a phase-modulated form.

BRIEF DESCRIPTION OF THE DRAWINGS

A preferred continuous-wave laser embodiment of the present invention is described below by reference to the following drawings, in which:

FIG. 4 shows details of an electronic data stream and the respective phase-modulated optical signals of the present invention, in representative binary form; and FIG. 5 shows details of other electronic data streams and phase-modulated optical signals of the present invention, in representative binary form.

DETAILED DESCRIPTION

Figure 1:
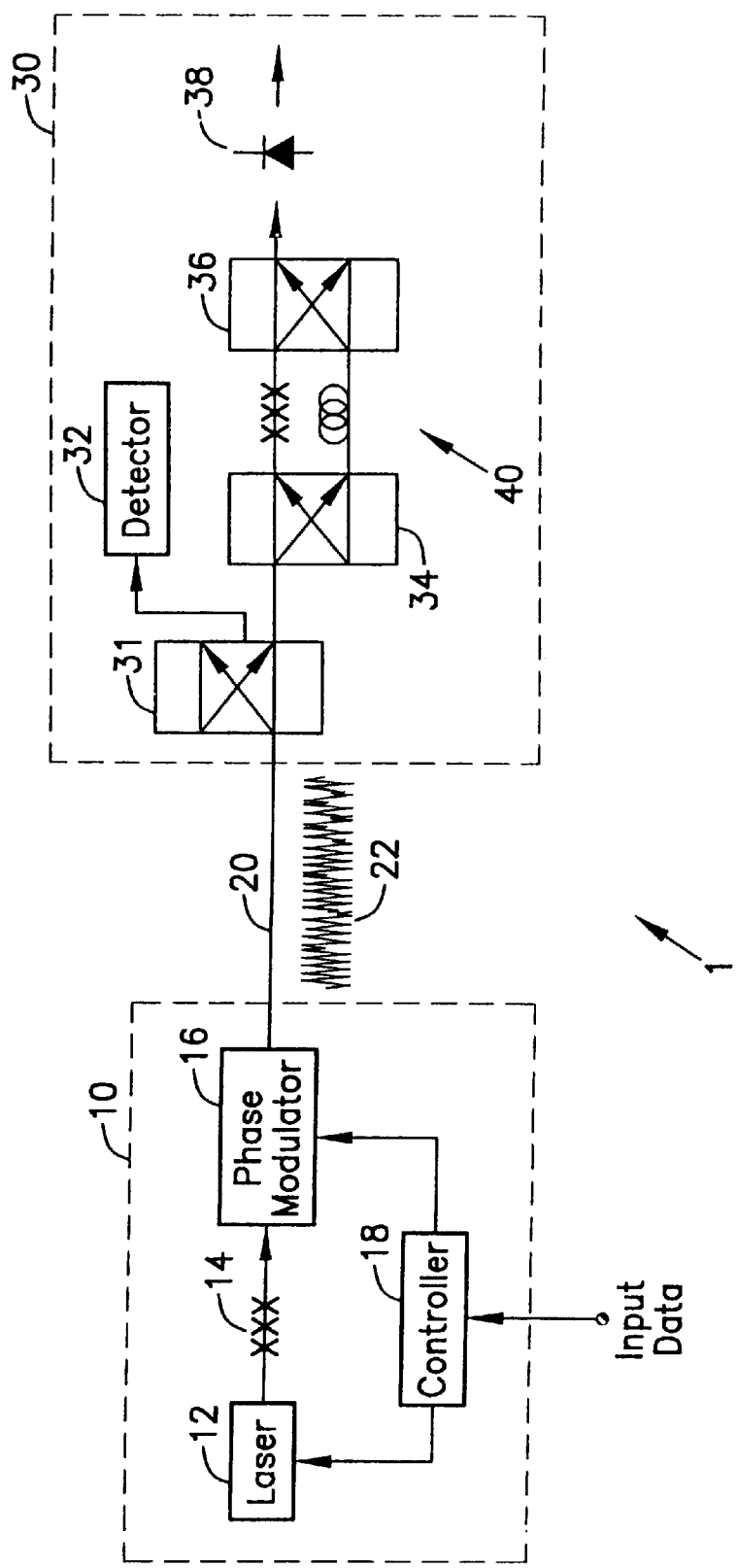
FIG. 1 shows a schematic of the system of the present invention.

FIG. 1 shows a preferred embodiment of a secure telecommunications system 1 according to the present invention. The system 1 includes a transmitter 10, an optical fiber 20 of a telecommunications network, and a receiver 30. Transmitter 10 includes a continuous wave coherent laser 12, for example a semiconductor laser emitting a narrow band of light at approximately 1550 nm, or at other wavelengths. The laser light preferably does not vary in wavelength by more than 2 nm, and most preferably by not more than 1 nm. Light emitted from laser 12 is depolarized by a depolarizer 14 and passes through a phase modulator 16, for example a Mach-Zender phase modulator. An electronic controller 18, for example a PLC, controls phase modulator 16. Controller 18 is also programmable to control the optical power output of light emitted by laser 12. Preferably, the power output is set as low as possible for a given optical span, while maintaining a low bit error rate. This reduces the light available for any tap.

Figure 3:
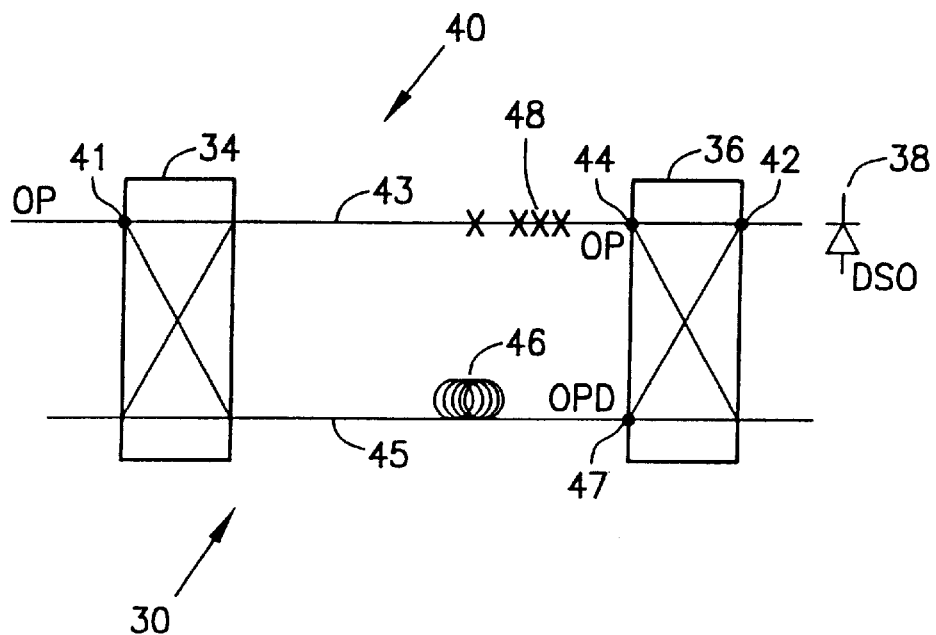
FIG. 3 shows in a larger view the interferometer FIG. 1.

Depending on the controller output, phase modulator 16 either imparts no phase shift to the non-information bearing light (representing for example a binary zero) or a certain degree phase shift (representing for example a binary one) on the light passing through phase modulator 16, thus creating an optical signal 22, which represents a stream of binary bits. Preferably, the phase shift is 180 degrees, although it may be modified depending on the type of receiver. Information-bearing optical signal 22 is transmitted over fiber 20 to receiver 30. Receiver 30 includes a coupler/splitter 31, functioning as a splitter, a light monitoring detector 32, a coupler/splitter 34, functioning as a splitter, and coupler/splitter 36, functioning as a coupler. The coupler 34 and splitter 36 together define part of an interferometer 40, as will be described with reference to FIG. 3.

Figure 2:
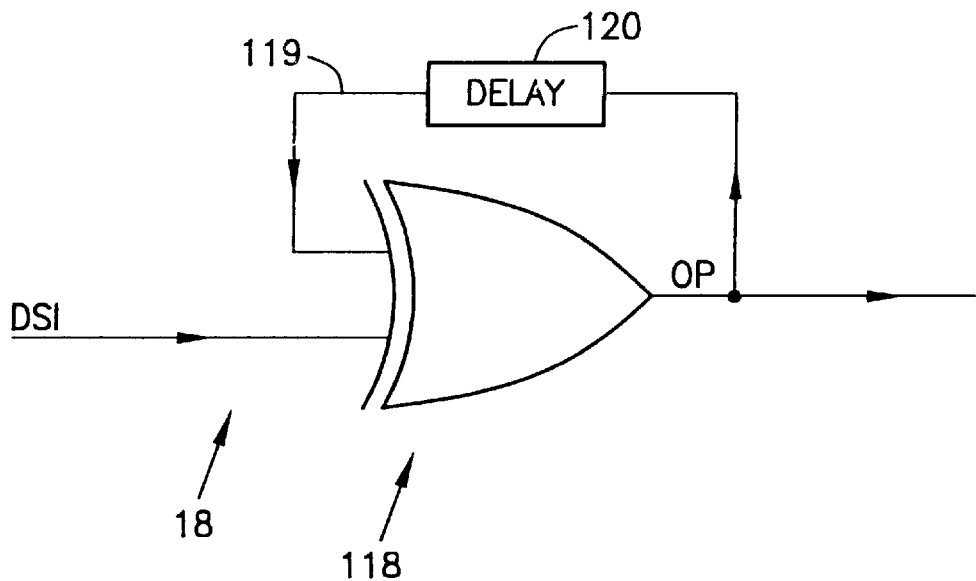
FIG. 2 shows details of the circuit of the controller of FIG. 1.

FIG. 2 shows a schematic of part of the circuitry of controller 18 of FIG. 1. Input data identified as DSI forms an input B of an exclusive-or gate 118. The other input A of the exclusive-or gate 118 is a feedback loop 119, which feeds back the output of exclusive-or gate 118, and provides an electronic delay circuit 120, which causes output OP to arrive at input A with a delay, for example, a certain number of bits later. Exclusive-or gate 118 thus is a delayed-feedback exclusive-or gate, which outputs an output electronic data stream OP for controlling phase modulator 16. Phase modulator 16 phase modulates the light output from the laser 12 based on the electronic data stream OP. Optical signal 22 in FIG. 1 thus corresponds to the data in electronic data stream OP.

Optical signal 22 of FIG. 1, which has a constant maximum amplitude, then passes to receiver 30. Splitter 31 splits off a portion of the light, directing part of the optical energy to the light-monitoring detector 32 and passing the remaining light to the interferometer 40. A detector 32, for example a light energy detector, monitors the light energy in the fiber 20 via the light energy coupled to the detector by splitter 31, the light energy being a function of the amplitude. If the amplitude drops, most likely from a tap, the detector alerts the receiver and can, for example, sound an alarm or alert network maintenance personnel. Additionally, since the receiver is generally part of a component box, which also includes a transmitter, the component box transmitter can send a signal back to the component box containing transmitter 10 so as to instruct transmitter 10 to stop sending data, or to send data over a standby fiber. Detector 32, while preferably part of receiver 30, also could be located separately from receiver 30, for example where fiber 20 enters a building or other secure environment.

Optical signal 22 after passing splitter 31 then enters interferometer 40 at an input 41 of splitter 34. Splitter 34 splits light entering input 41, so that the signal OP travels over both a first fiber 43 and a second fiber 45. A depolarizer 48 may depolarize light passing through fiber 43, preferably, or fiber 45 as an alternative. Second fiber 45 includes a delay fiber 46 which a fiber loop of a desired length. Delay fiber 46 then provides an input which recombines the delayed signal with the non-delayed signal propagating through fiber 43 and depolarizer 48 at output 42. The physical delay imposed by the interferometer 40 in the second light path through fiber 45, with its delay loop 46, with respect to light passing through the first light path through fiber 43 and depolarizer 48 is selected to match as closely as possible an electronic delay time ED imposed by electronic delay circuit 120 of the controller 18. If the first path in the interferometer 40 has a length L1 and the second path a length L2, the length L2 is selected, preferably by sizing loop 46, as a function of L1, the speed of light v in fibers 43 and 45, the light propagation delay through the depolarizer 48, DPD, and the electronic delay time ED. The speed of light in the fibers may be estimated as a function of the wavelength and the type of fiber used. The length L1 is known. When depolarizer 48 is in path 43, L2 is then chosen to approximate, and preferably equal, the amount (ED+DPD)*v+L1. The actual permissible difference between the two amounts depends on the light source and the accuracy of any electronic filtering of the output signal.

The light recombining at output 42 thus recombines the signal OP with a delayed signal OPD, delayed by an amount of time equivalent to the electronic delay time ED. If the data in the OP and OPD signals each represents a zero, or each represents a one, at the inputs 44 and 47 to coupler 36, the signals will destructively interfere when recombined at output 42 of coupler 36. Output detector 38 then detects no light and a produces a zero signal. If one of the data bits in the OP and OPD signals represents a zero and the other one represents a one, at the inputs 44 and 47 to coupler 36, the signals will constructively interfere when recombined at coupler output 42. Output detector 38 then detects light and produces an electronic signal representative of a one.

The interferometer 40 comprising coupler/splitter 34 and 36, fibers 43 and 45, delay fiber 46, and depolarizer 48 thus functions as an optical exclusive-or gate with one input leg delayed for signals arriving at input 41 of coupler 34. Interferometer 40 as a whole thus optically and physically "decodes" the signal OP produced by the delayed-feedback exclusive-or gate 118 of FIG. 2.

FIG. 4 shows a schematic example of the functioning of the system 1 with a two-bit delay imposed by delay circuit 120. The electronic data stream input DSI is also the input B for exclusive-or gate 118. The first two delayed bits from input A are determined by the previous two bits in stream B, and as will be demonstrated with respect to FIG. 5, do not affect the functioning of the system 1. Assuming for purposes of FIG. 4 that the delayed bits 64 entered input A as zero and zero, the output OP is as shown. Phase modulator 16 then converts this electronic data stream OP into optical signal 22 representative of OP. The interferometer 40 then creates delayed optical signal OPD, also delayed two bits from the optical signal representative of OP. At combiner 36, the two signals OP and OPD produce, at output 42 and photodiode detector 38, the data stream output DSO. As shown, input data stream DSI and output data stream DSO are the same after accounting for delay and initialization.

FIG. 5 shows the effect of having a different first two delayed bits 65 from input A on the same data stream input DSI of FIG. 4. While the data stream OP and OPD thus differ from those in FIG. 4, the resulting data stream output DSO is the same as in FIG. 4.

System 1 provides a secure method for transmitting data over a single optical fiber, which is difficult to decode if tapped, and also permits excellent detection of the existence of a tap.

As an alternate but not preferred embodiment, the controller could directly phase modulate the signal based on the electronic output, and an electronic delay could be provided at the receiver.

What is claimed is:

1. A fiber optic data transmission system comprising:
 a transmitter having a laser emitting a continuous wave light,
 a phase modulator phase modulating the continuous wave light as a function of an electronic input data stream and of an electronic feedback loop with a feedback time delay, the electronic feedback loop being fed back to the electronic input data stream, so as to create an optical signal bearing information in phase-modulated form, and
 a telecommunications optical fiber connected to at least one receiver, the phase-modulator being connected to the telecommunications fiber so that the phase-modulated information optical signal is transmitted over the telecommnnunications fiber without recombining with the continuous wave light, the receiver including an interferometer having a first fiber arm and a second fiber arm and having an interferometric delay being a function of the feedback time delay.

2. The system as recited in claim 1 wherein the laser has a wavelength that does not vary by more than 2 nm.

3. The system as recited in claim 2 wherein the wavelength does not vary by more than 1 nm.

4. The system as recited in claim 1 wherein the phase-modulator phase modulates all of the continuous wave light.

5. The system as recited in claim 1 further comprising a tap detection monitor monitoring an amplitude of the phase-modulated information optical signal.

6. The system as recited in claim 1 wherein an amplitude of the phase-modulated optical signal is constant.

7. A method for sending data in phase-modulated form over a telecommunications optical fiber comprising the steps of:
 receiving electronic input data;
 feeding back feedback electronic data with a feedback time delay and combining the feedback electronic data with the electronic input data so as to create an electronic control data stream;
 phase-modulating continuous wave light from a laser as a function of the electronic control data stream so as to create a phase-modulated optical data stream,
 sending the phase-modulated optical data stream over a telecommunications optical fiber in a phase-modulated form without the continuous wave light entering the optical fiber directly from the laser, and
 receiving the phase-modulated optical data and passing the optical data through an interferometer having an interferometric delay being a function of the feedback time delay.

8. The method as recited in claim 7 further comprising monitoring the optical fiber for a reduction in an amplitude of the phase-modulated signal.

9. The method as recited in claim 7 wherein the laser has a wavelength that does not vary by more than 2 nm.

10. The method as recited in claim 9 wherein the wavelength does not vary by more than 1 nm.

11. The method as recited in claim 9 wherein all of the continuous wave light from the laser is phase-modulated by a single phase-modulator.

12. A method for sending data in phase-modulated form over a telecommunications optical fiber comprising the steps of:
 receiving electronic input data;
 feeding back feedback electronic data with a feedback time delay and combining the feedback electronic data with the electronic input data so as to create an electronic control data stream;
 phase-modulating continuous wave light from a laser as a function of the electronic control data stream so as to create a phase-modulated optical data stream;

sending the phase-modulated optical data stream over a telecommunications optical fiber in a phase-modulated form, all of the continuous wave light entering the optical fiber being phase modulated;

monitoring an energy level of the phase-modulated optical data stream; and receiving the phase-modulated optical data and passing the optical data through an interferometer having an interferometric delay being a function of the feedback time delay.

13. The method as recited in claim 12 wherein the monitoring occurs at a receiver for the phase-modulated optical data.

14. The method as recited in claim 12 wherein the feedback time delay is a function of a bit rate of the electronic input data.

15. The method as recited in claim 12 wherein the feedback time delay equals the interferometric delay.

16. The method as recited in claim 12 further comprising passing the electronic input data and the feedback through an exclusive-or gate.

17. The method as recited in claim 7 wherein the feedback time delay is a function of a bit rate of the electronic input data.

18. The method as recited in claim 7 further comprising passing the electronic input data and the feedback through an exclusive-or gate.

19. A fiber optic data transmission system comprising:

a transmitter having a laser emitting a continuous wave light, a phase modulator phase modulating the continuous wave light so as to create an optical signal bearing information in phase-modulated form, and an electronic control circuit for controlling the phase modulator, the electronic control circuit including an electronic input data stream, an exclusive-or gate and having a feedback loop with a feedback time delay, the electronic input data stream and the feedback loop passing though the exclusive-or gate;

a receiver, the receiver including an interferometer having a first fiber arm and a second fiber arm and having an interferometric delay being a function of the feedback time delay;

a telecommunications optical fiber connected to the receiver, the phase-modulator being connected to the telecommunications fiber so that the phase-modulated information optical signal is transmitted over the telecommunications fiber without recombining with the continuous wave light; and an energy level detector detecting an energy level of the phase-modulated optical signal in the optical fiber.

20. The system as recited in claim 19 wherein the receiver includes the energy level detector.

* * * * *